US009360803B2

(12) United States Patent
Tsubota

(10) Patent No.: US 9,360,803 B2
(45) Date of Patent: Jun. 7, 2016

(54) IMAGE FORMING APPARATUS, FIXING DEVICE, DRYING DEVICE, DEVELOPER, AND LIQUID DROPLETS FOR USE IN IMAGE FORMATION

(71) Applicant: FUJI XEROX CO., LTD., Minato-ku, Tokyo (JP)

(72) Inventor: Hirokazu Tsubota, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/482,598

(22) Filed: Sep. 10, 2014

(65) Prior Publication Data

US 2015/0268587 A1 Sep. 24, 2015

(30) Foreign Application Priority Data

Mar. 19, 2014 (JP) .................................. 2014-056539

(51) Int. Cl.
| G03G 15/08 | (2006.01) |
| G03G 15/10 | (2006.01) |
| G03G 15/11 | (2006.01) |
| G03G 9/12 | (2006.01) |
| G03G 9/08 | (2006.01) |
| C09D 11/30 | (2014.01) |
| G03G 15/20 | (2006.01) |

(52) U.S. Cl.
CPC ............... *G03G 15/10* (2013.01); *C09D 11/30* (2013.01); *G03G 9/08* (2013.01); *G03G 9/12* (2013.01); *G03G 15/08* (2013.01); *G03G 15/11* (2013.01); *G03G 15/2007* (2013.01); *G03G 15/2053* (2013.01); *G03G 2215/00666* (2013.01)

(58) Field of Classification Search
CPC ... G03G 15/2007; G03G 15/08; G03G 15/10; G03G 2215/00666; G03G 2215/0626; G03G 15/11; G03G 9/08; G03G 9/11; B41J 2/38; B41J 2/385; B41J 2/42; C09D 11/30; C09D 11/02
USPC .................. 399/335, 336, 341, 251; 219/216; 347/99, 100, 102, 185
See application file for complete search history.

(56) References Cited

U.S. PATENT DOCUMENTS

| 7,268,327 B2 * | 9/2007 | Yamamoto ............. H05B 6/145 219/619 |
| 2008/0095558 A1 * | 4/2008 | Schleusener .................. 399/336 |
| 2009/0097889 A1 * | 4/2009 | Nou et al. ...................... 399/321 |
| 2010/0047707 A1 * | 2/2010 | Ueda .................... G03G 9/0804 430/110.1 |
| 2010/0124713 A1 * | 5/2010 | Farrugia et al. ............. 430/108.1 |
| 2011/0155721 A1 * | 6/2011 | Kladias et al. ................ 219/634 |
| 2013/0183073 A1 * | 7/2013 | Zhang et al. .................. 399/336 |

FOREIGN PATENT DOCUMENTS

| JP | 57062058 A | * | 4/1982 |
| JP | 01028657 A | * | 1/1989 |
| JP | 05297677 A | * | 11/1993 |
| JP | 7-28349 A | | 1/1995 |
| JP | 7-140828 A | | 6/1995 |

(Continued)

*Primary Examiner* — Robert Beatty
(74) *Attorney, Agent, or Firm* — Sughrue Mion, PLLC

(57) ABSTRACT

An image forming apparatus includes an image forming unit that forms an image on a recording medium by using a developer and an energy generating unit that generates energy that causes the developer on the recording medium, on which the image has been formed by the image forming unit, to generate heat.

7 Claims, 11 Drawing Sheets

(56) References Cited

FOREIGN PATENT DOCUMENTS

| JP | 09325583 | A | * | 12/1997 |
| JP | 10-48986 | A | | 2/1998 |
| JP | 2002148976 | A | * | 5/2002 |
| JP | 2006322956 | A | * | 11/2006 |
| JP | 2009279782 | A | * | 12/2009 |
| JP | 2010204265 | A | * | 9/2010 |

* cited by examiner

IMAGE FORMING APPARATUS, FIXING DEVICE, DRYING DEVICE, DEVELOPER, AND LIQUID DROPLETS FOR USE IN IMAGE FORMATION

CROSS-REFERENCE TO RELATED APPLICATIONS

This application is based on and claims priority under 35 USC 119 from Japanese Patent Application No. 2014-056539 filed Mar. 19, 2014.

BACKGROUND

Technical Field

The present invention relates to an image forming apparatus, a fixing device, a drying device, developer, and liquid droplets for use in image formation.

SUMMARY

According to an aspect of the invention, there is provided an image forming apparatus including an image forming unit that forms an image on a recording medium by using a developer and an energy generating unit that generates energy that causes the developer on the recording medium, on which the image has been formed by the image forming unit, to generate heat.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described with reference to the drawings.

Figure 1:
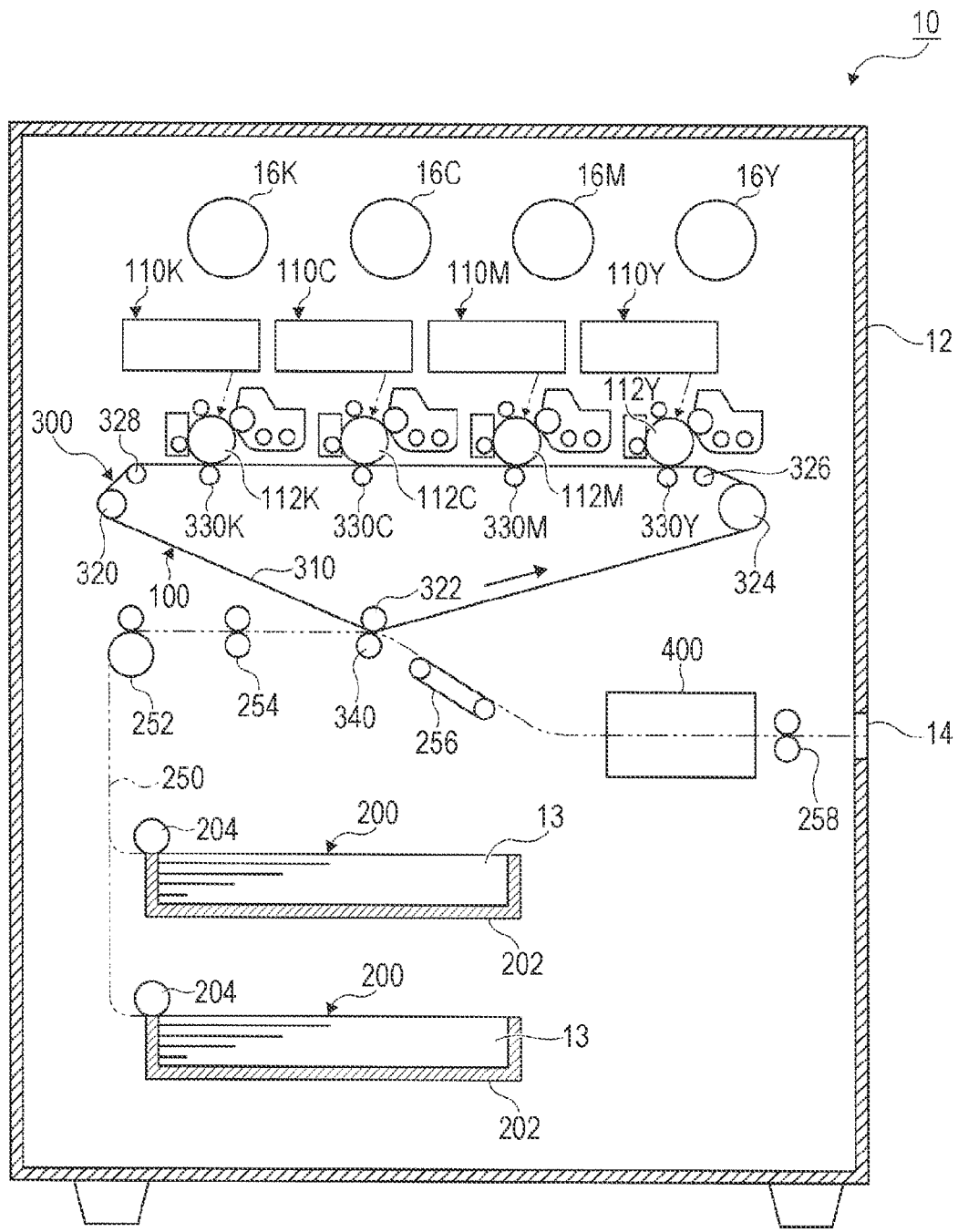
FIG. 1 is a schematic diagram illustrating a schematic configuration of an image forming apparatus according to a first exemplary embodiment of the invention as seen from the front.

FIG. 1 illustrates an image forming apparatus 10 according to a first exemplary embodiment of the invention. As illustrated in FIG. 1, the image forming apparatus 10 includes an image forming apparatus body 12, and an ejection port 14 from which sheets 13, which are to be used as recording media, are to be ejected is formed in the image forming apparatus body 12. Developer containers 16Y, 16M, 16C, and 16K that contain developer (toner), an image forming unit 100 that forms developer images on one of the sheets 13 by using the developer supplied from the developer containers 16Y, 16M, 16C, and 16K, sheet feed devices 200 that are, for example, two sheet feed devices and that feed the sheets 13 to the image forming unit 100, a transfer device 300 that transfers the developer images, which have been formed by the image forming unit 100, onto one of the sheets 13, a fixing device 400 that fixes the developer images, which have been transferred to the sheet 13, onto the sheet 13 are disposed in the image forming apparatus body 12. In addition, a transport path 250 that is used for transporting the sheets 13 is formed in the image forming apparatus body 12. Note that details of the developer (toner) will be described later.

The image forming unit 100 includes photoconductor drums 112Y, 112M, 112C, and 112K that are used as image carriers and includes a yellow developer image forming unit 110Y, a magenta developer image forming unit 110M, a cyan developer image forming unit 110C, and a black developer image forming unit 110K that form a yellow developer image, a magenta developer image, a cyan developer image, and a black developer image, respectively, on surfaces of the corresponding photoconductor drums 112Y, 112M, 112C, and 112K. Details of the yellow developer image forming unit 110Y, the magenta developer image forming unit 110M, the cyan developer image forming unit 110C, and the black developer image forming unit 110K will be described later.

The transfer device 300 includes an intermediate transfer body 310 onto which the developer images, which have been formed on the photoconductor drums 112Y, 112M, 112C, and 112K, are to be transferred in such a manner as to be superposed with one another. The intermediate transfer body 310 has a belt-like shape and an endless loop shape, is supported by support rollers 320, 322, 324, 326, and 328, and rotates in a direction indicated by an arrow in FIG. 1 by receiving a driving force that is transmitted from at least one of the support rollers 320, 322, 324, 326, and 328.

In addition, the transfer device 300 includes first transfer devices 330Y, 330M, 330C, and 330K that are used for transferring the developer images onto the intermediate transfer body 310 from the photoconductor drums 112Y, 112M, 112C, and 112K. Furthermore, the transfer device 300 includes a second transfer device 340 that transfers the developer images, which have been transferred to the intermediate transfer body 310, onto one of the sheets 13.

Each of the sheet feed devices 200 includes a sheet accommodating unit 202 and a delivery roller 204 that delivers one of the sheets 13 that are accommodated in the accommodating unit 202, the sheet 13 being at the top of the sheets 13, to the transport path 250.

The transport path 250 is a transport path that transports one of the sheets 13 that has been fed from one of the sheet feed devices 200 to the ejection port 14, and the above-mentioned delivery rollers 204, transport rollers 252, registration rollers 254, the above-mentioned support roller 322, the second transfer device 340, a transport device 256, the above-described fixing device 400, and ejection rollers 258 are disposed along the transport path 250 in this order starting from an upstream side in a transport direction of the sheet 13.

The transport rollers 252 transport one of the sheets 13 to the registration rollers 254. The registration rollers 254 cause, while not rotating, an end of the sheet 13 to be temporarily stationary and start rotating at a predetermined timing in such a manner as to feed the sheet 13 to a portion where the support roller 322 and the second transfer device 340 are in contact with each other in accordance with the timing of transferring the developer images onto the intermediate transfer body 310. The transport device 256 transports the sheet 13, to which the developer images have been transferred but not yet fixed, to the fixing device 400 while supporting the sheet 13 from the bottom in the direction of gravity. The ejection rollers 258 ejects the sheet 13 to outside the image forming apparatus body 12 by causing the sheet 13, to which the developer images have been fixed by the fixing device 400, to pass through the ejection port 14.

The fixing device 400 applies energy to developer on the sheet 13, on which the developer images have been formed, and fixes the developer onto the sheet 13. Details of the fixing device 400 will be described later.

Figure 2:
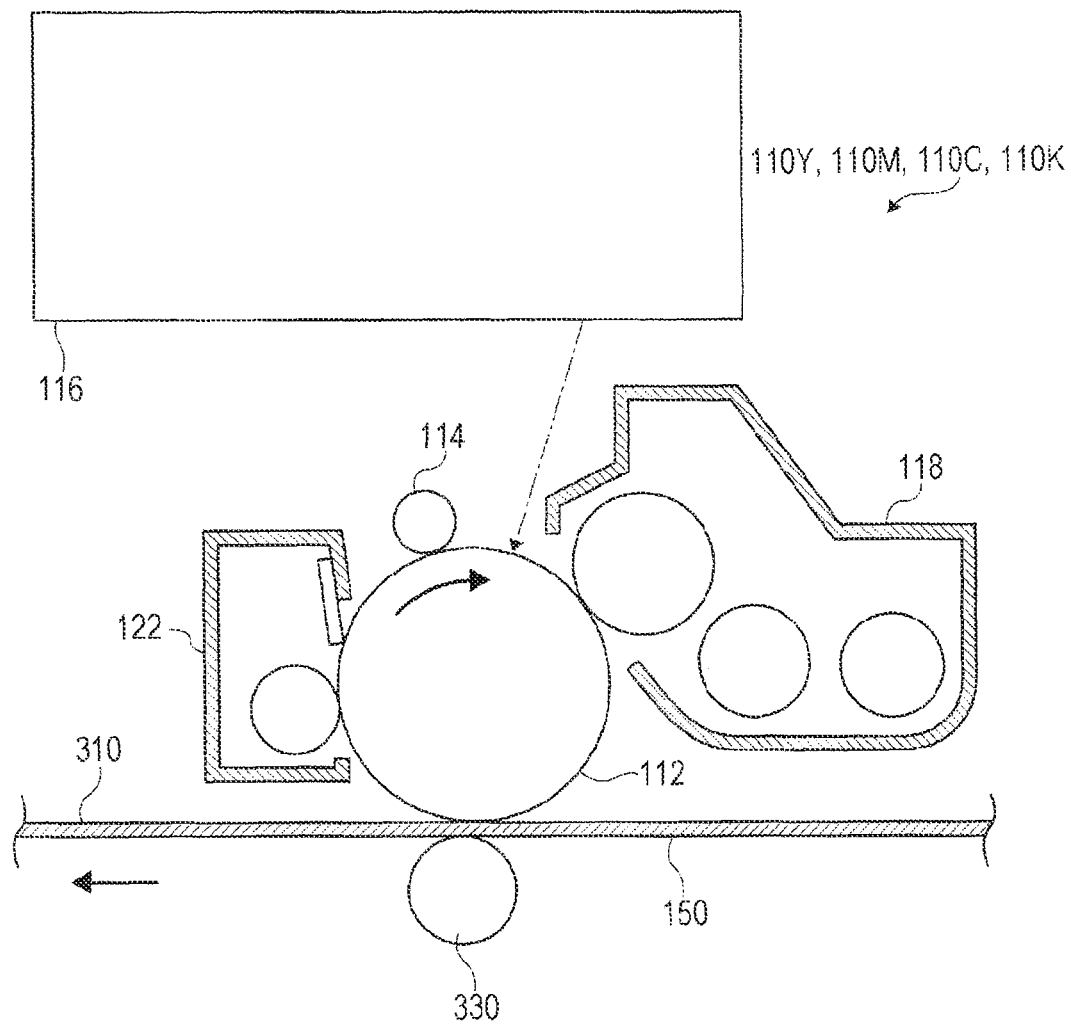
FIG. 2 is a schematic diagram illustrating a developer image forming unit that is included in the image forming apparatus illustrated in FIG. 1.

FIG. 2 illustrates the developer image forming units 110Y, 110M, 110C, and 110K. Although each of the developer image forming units 110Y, 110M, 110C, and 110K uses developer of a different color and forms an image of a different color, the configurations of the developer image forming units 110Y, 110M, 110C, and 110K are the same as one another. Thus, the developer image forming units 110Y, 110M, 110C, and 110K will be hereinafter collectively called a developer image forming unit 110, and the developer image forming unit 110 will now be described. As illustrated in FIG. 2, the developer image forming unit 110 includes a charging device 114 that charges a surface of a photoconductor drum 112, a latent image forming device 116 that radiates light onto the surface of the photoconductor drum 112, which has been charged by the charging device 114, in such a manner as to form a latent image, a developing device 118 that develops the latent image, which has been formed on the surface of the photoconductor drum 112 by the latent image forming device 116, by using developer, and a cleaning device 122 that cleans the surface of the photoconductor drum 112 after a developer image has been transferred to the intermediate transfer body 310 by a first transfer device 330.

Figure 3:
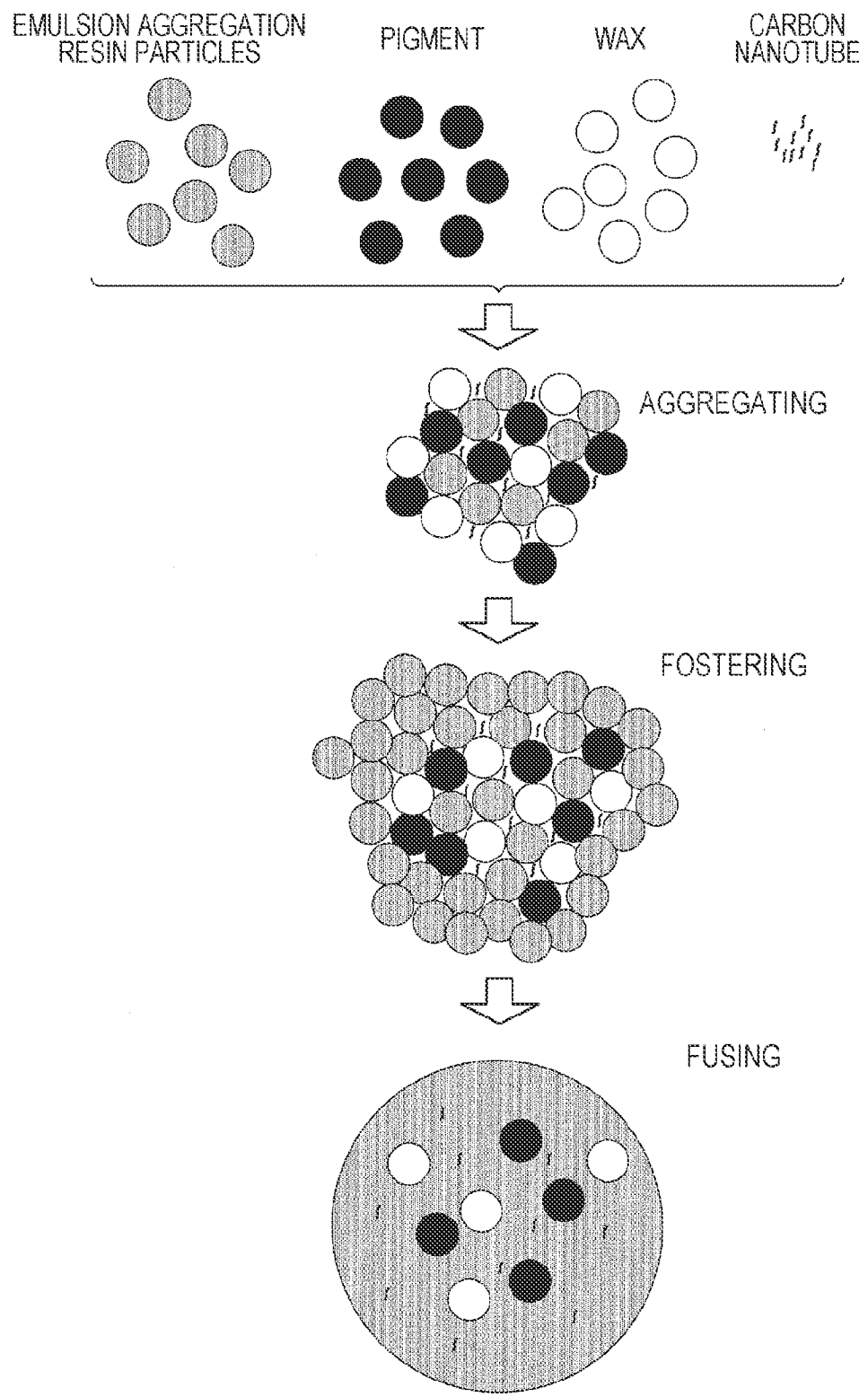
FIG. 3 is a schematic diagram illustrating a method of manufacturing developer.

The developer according to the first exemplary embodiment is manufactured in such a manner as to include carbon nanotubes and manufactured by, for example, the emulsion aggregation method as illustrated in FIG. 3. FIG. 3 is a schematic diagram illustrating a method of manufacturing the developer according to the first exemplary embodiment. In the exemplary manufacturing method illustrated in FIG. 3, an emulsion aggregation resin particle dispersion liquid that includes emulsion aggregation resin particles each of which has a diameter of about one micron, a pigment-dispersion liquid, a wax dispersion liquid, and carbon nanotubes are mixed into pure water. An aggregate is generated and heated, the aggregate is subjected to fostering, and after that, the aggregate is further heated. Aggregated particles are fused together. As a result, toner particles are obtained. After that, the toner particles are cooled and undergo a cleaning process, a drying process, and the like, and the developer is eventually manufactured.

Note that the carbon nanotubes that are to be mixed into the pure water are, for example, carbon nanotubes each having a size of a few nanometers, and these carbon nanotubes are dispersed in the pure water at a predetermined concentration. Here, the structure of the carbon nanotubes is not particularly limited, and for example, single-layer carbon nanotubes that have a helical structure may be used. The amount of carbon nanotubes that are to be mixed into the pure water is suitably adjusted in such a manner that each of the toner particles, which have been subjected to fostering, includes the carbon nanotubes. Note that since carbon nanotubes are hydrophobic, there is a method of, for example, oxidizing carbon nanotubes so as to cause the carbon nanotubes to have a carboxyl group in order to decompose the carbon nanotubes into pure water.

Note that the method of manufacturing the developer according to the first exemplary embodiment is not limited and may be any other method as long as developer that includes carbon nanotubes is obtained. For example, the developer may be a polymerized toner that is obtained by any other polymerization method. In addition, the developer is not limited to such a polymerized toner and may be any other chemical toner or may be a ground toner that is obtained by a kneading and grinding method in which a binder resin, a coloring agent, a release agent or the like is kneaded, ground, and classified.

Although the above-described developer has a configuration in which the carbon nanotubes are included in the toner particles that have been fused together, the developer is not limited to have the configuration in which the carbon nanotubes are included in the toner particles and may be formed in such a manner as to include the carbon nanotubes independently of the toner particles.

Figure 4:
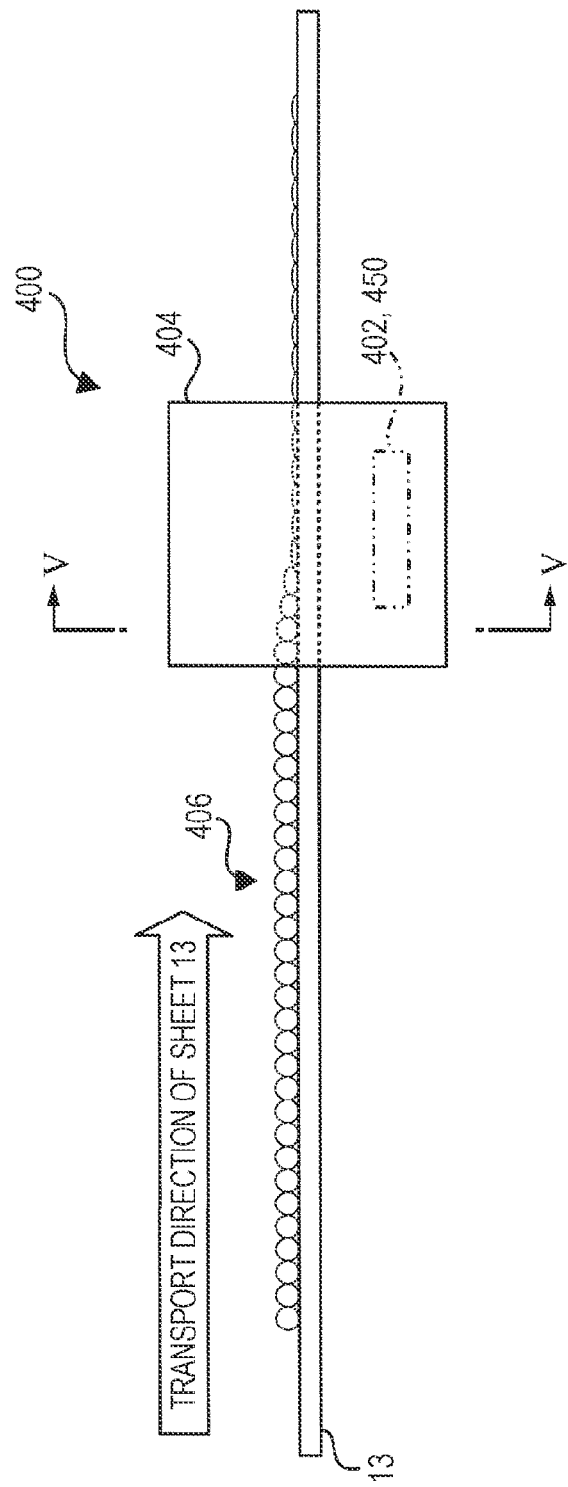
FIG. 4 is a side view schematically illustrating a fixing device.
Figure 5:
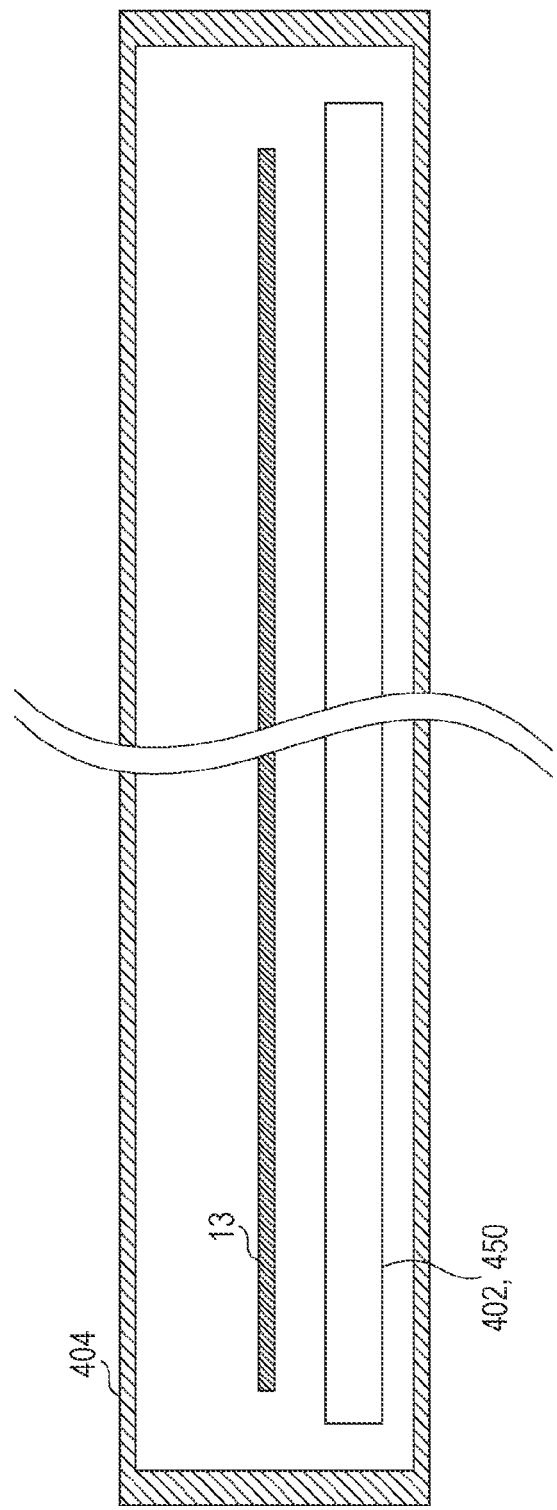
FIG. 5 is a cross-sectional view taken along the plane V-V of FIG. 4.

The fixing device 400 will now be described. FIG. 4 is a side view schematically illustrating the fixing device 400, and FIG. 5 is a cross-sectional view taken along the plane V-V of FIG. 4. The fixing device 400 according to the first exemplary embodiment includes a magnetic flux generating device 402 that functions as an energy generating unit and a magnetic flux shielding body 404.

The magnetic flux generating device 402 generates energy and applies the energy to a developer 406 on one of the sheets 13 on which an image has been formed by the image forming unit 100. More specifically, the magnetic flux generating device 402 applies a magnetic flux that varies with a predetermined frequency (e.g., a few GHz) to the developer 406 on the sheet 13. Note that the magnetic flux generating device 402 is configured to generate a high-frequency magnetic flux by, for example, applying an alternating current to an induction coil and to apply the magnetic flux across the full width of the sheet 13.

As illustrated in FIG. 4 and FIG. 5, the magnetic flux generating device 402 is disposed, for example, beneath the transport path 250 along which the sheet 13 is to be transported and applies the magnetic flux to the sheet 13, which is to be transported, from the bottom.

Note that although the magnetic flux generating device 402 is disposed beneath the sheet 13, which is to be transported, in the example illustrated in FIG. 4 and FIG. 5, the position of the magnetic flux generating device 402 is not limited to the position illustrated in FIG. 4 and FIG. 5 as long as the magnetic flux generating device 402 is arranged in such a manner as to be capable of applying the magnetic flux to the developer 406 on the sheet 13 on which an image has been formed by the image forming unit 100. For example, the magnetic flux generating device 402 may be disposed above the sheet 13, which is to be transported.

The magnetic flux shielding body 404 is a member that blocks the magnetic flux, which is generated by the magnetic flux generating device 402, and made of, for example, aluminum or the like. The magnetic flux shielding body 404 limits the area of a magnetic field that is generated by the magnetic flux generating device 402. As illustrated in FIG. 4 and FIG. 5, the magnetic flux shielding body 404 has, for example, a square cylindrical shape that surrounds the magnetic flux generating device 402 and a portion of the sheet 13, which is to be transported, and that is open in a movement direction of the sheet 13. Note that openings of the magnetic flux shielding body 404 may be made narrower as long as the openings are formed so as to be sufficiently large for the sheet 13 to be transported.

The magnetic flux shielding body 404 limits the area of the magnetic field, which is generated by the magnetic flux generating device 402, and suppresses the occurrence of leakage of the magnetic flux to a region other than a desired spatial region in the image forming apparatus 10.

Fixation of developer that is to be performed by the fixing device 400 according to the first exemplary embodiment will now be described. As described above, the developer 406 that is used in the first exemplary embodiment includes the carbon nanotubes. It is known that carbon nanotubes generate heat when subjected to a magnetic flux. The fixing device 400 according to the first exemplary embodiment utilizes this property of the carbon nanotubes and fixes toner onto one of the sheets 13 by causing the toner to melt. As described above, the fixing device 400 according to the first exemplary embodiment causes the developer 406 to generate heat and melt by applying a magnetic flux to the carbon nanotubes, each of which is a heat generating material, and fixes the developer 406 onto the sheet 13.

The fixing device 400 heats the developer 406 to at least a temperature at which the developer 406 melts. The temperature of the developer 406 heated by the fixing device 400 may be controlled by, for example, adjusting the length of time over which a magnetic flux is generated. For example, the magnetic flux generating device 402 may be configured to alternately repeat a state of generating a magnetic flux of a predetermined frequency and a state of not generating such a magnetic flux in such a manner as to adjust the length of the duration of the state where the magnetic flux is being generated. Alternatively, the fixing device 400 may adjust the heating temperature by adjusting the intensity of a magnetic field. Alternatively, heat conduction that occurs in the carbon nanotubes may be suppressed by coating the carbon nanotubes with a material such as silicon.

Modifications of the first exemplary embodiment will now be described.

Figure 6:
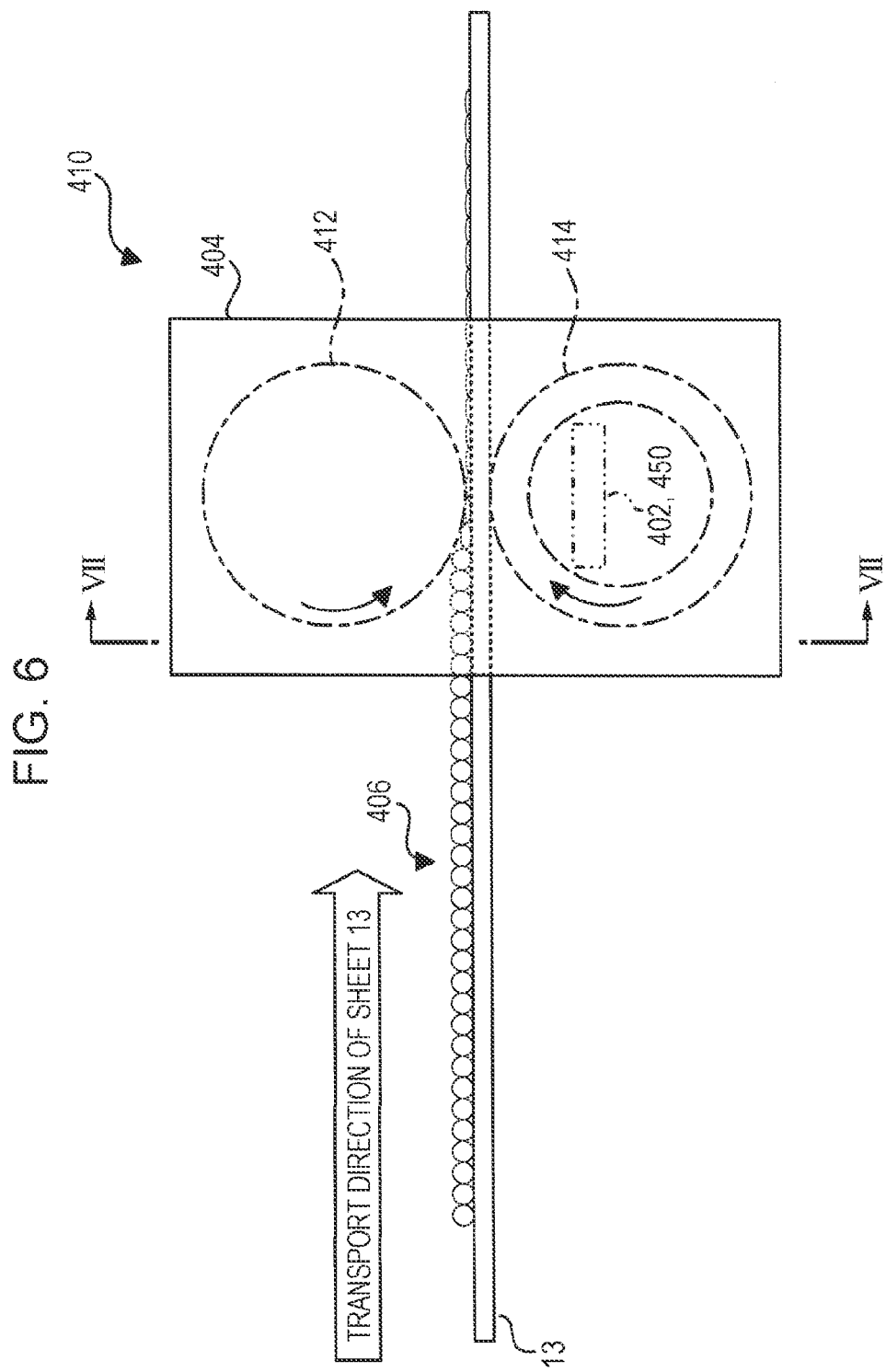
FIG. 6 is a side view schematically illustrating a fixing device according to a first modification of the first exemplary embodiment.
Figure 7:
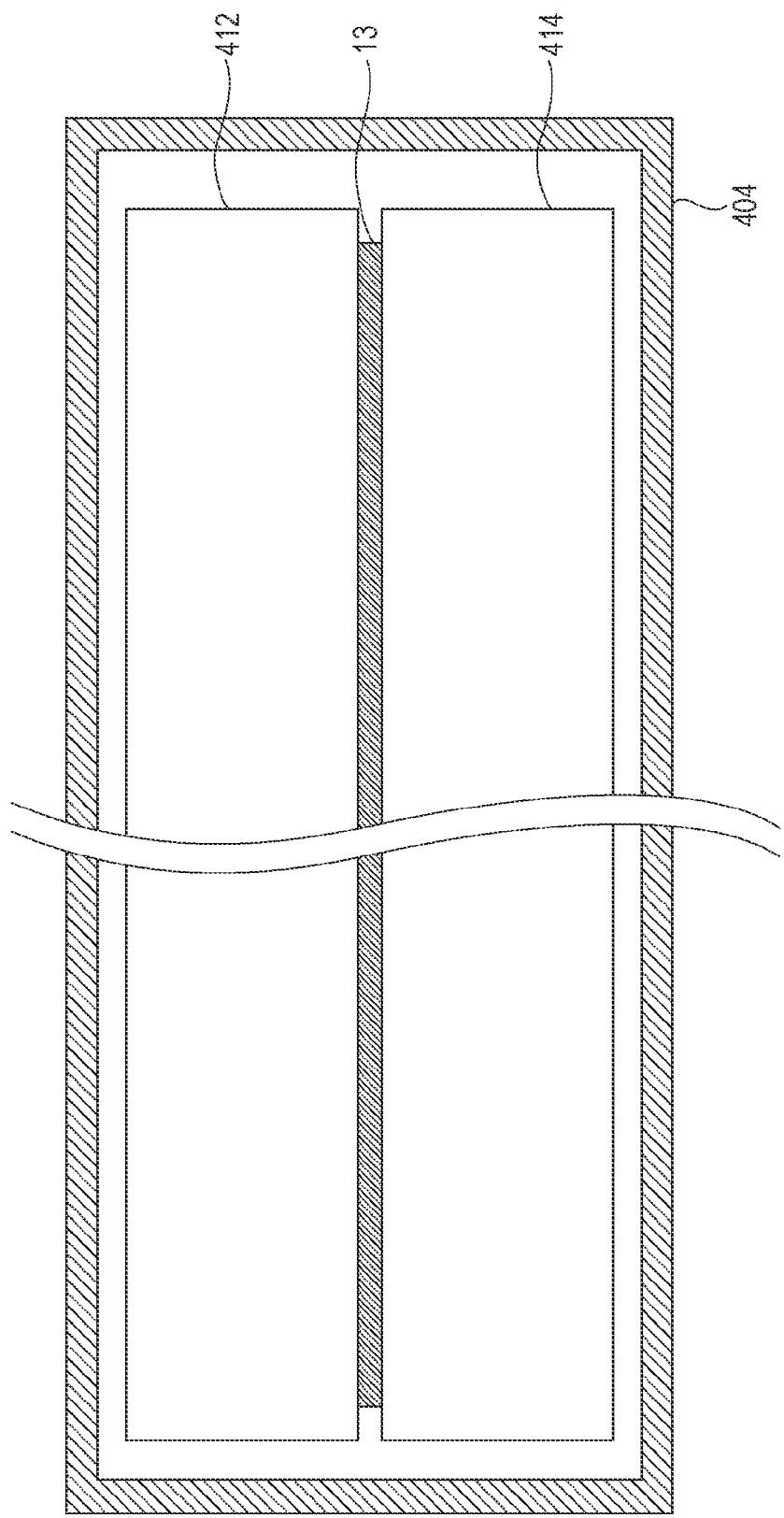
FIG. 7 is a cross-sectional view taken along the plane VII-VII of FIG. 6.

FIG. 6 is a side view schematically illustrating a fixing device 410 according to a first modification of the first exemplary embodiment, and FIG. 7 is a cross-sectional view taken along the plane VII-VII of FIG. 6. A difference from the fixing device 400 according to the first exemplary embodiment is that the fixing device 410 includes pressure rollers 412 and 414 that apply pressure to one of sheets 13.

The pressure rollers 412 and 414 are respectively disposed above and beneath the sheet 13 that is to be transported and apply pressure to the sheet 13, which is to be transported, by nipping the sheet 13 in the top-bottom direction. Each of the pressure rollers 412 and 414 applies pressure to the sheet 13, which is to be transported, by rotating in the direction of a corresponding one of arrows in FIG. 6. The pressure rollers 412 and 414 are made of, for example, a material having a predetermined or higher heat insulation property. In addition, the outer peripheral portion of the pressure roller 412 is covered with a release layer, and a surface of the sheet 13 on which developer images have been formed is less likely to be fixed onto the pressure roller 412.

The magnetic flux generating device 402 is disposed in, for example, the pressure roller 414 that is formed in a cylindrical shape and, similarly to the first exemplary embodiment, applies a magnetic flux to the developer 406 on one of the sheets 13. In this case, the pressure roller 414 is made of a material that will not block a magnetic flux that is generated by the magnetic flux generating device 402. Note that the magnetic flux generating device 402 is fixed in place whether or not the pressure roller 414 is rotating.

In the fixing device 410 according to the first modification, the developer 406 generates heat and melts due to the influence of the magnetic flux that is generated by the magnetic flux generating device 402, and the developer 406 is applied with pressure by the pressure rollers 412 and 414. This allows the surface of the developer 406 on the sheet 13 to become a mirror-finished surface, and gloss image quality may be obtained.

A second modification will now be described.

Figure 8:
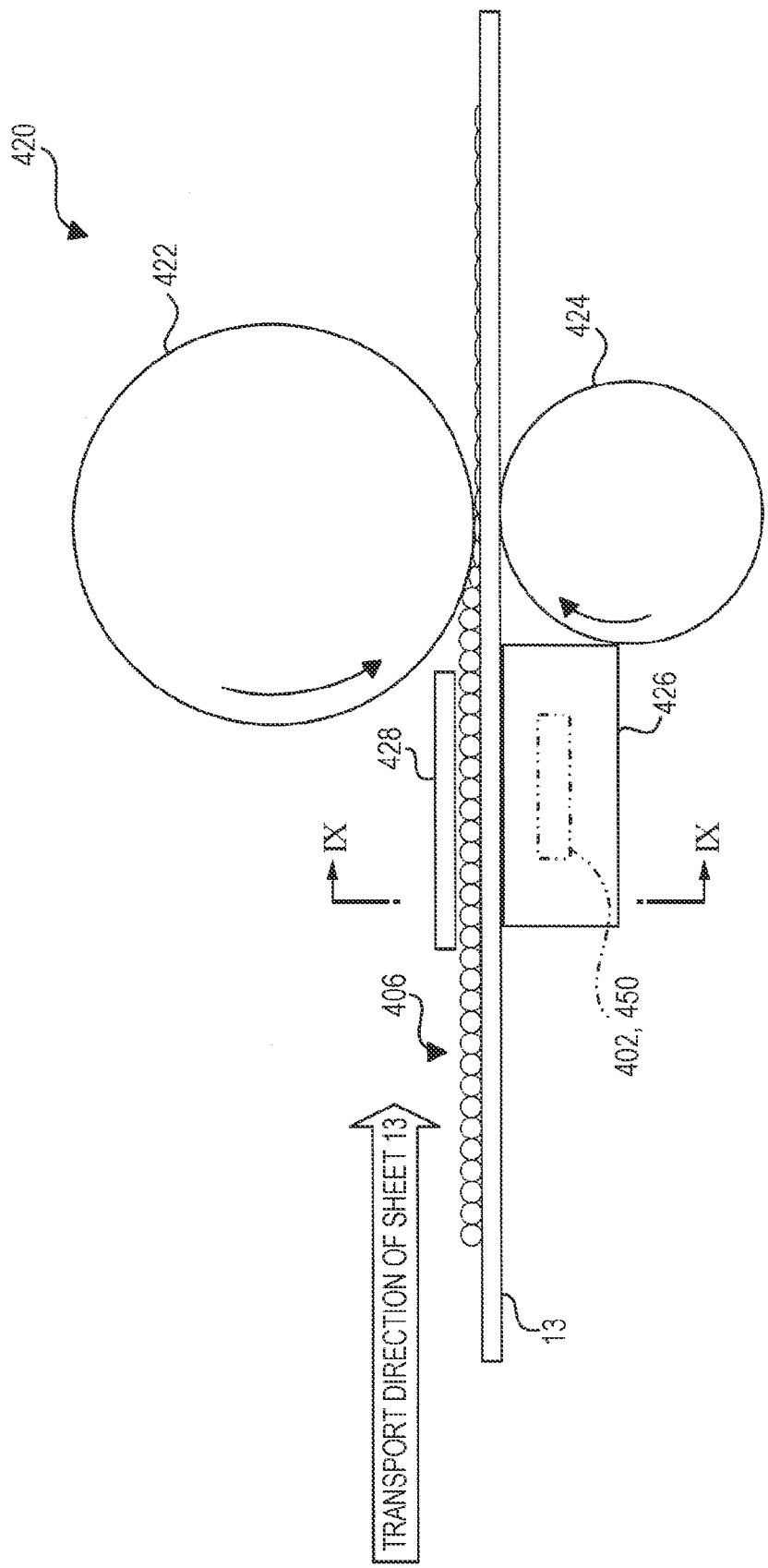
FIG. 8 is a side view schematically illustrating a fixing device according to a second modification of the first exemplary embodiment.
Figure 9:
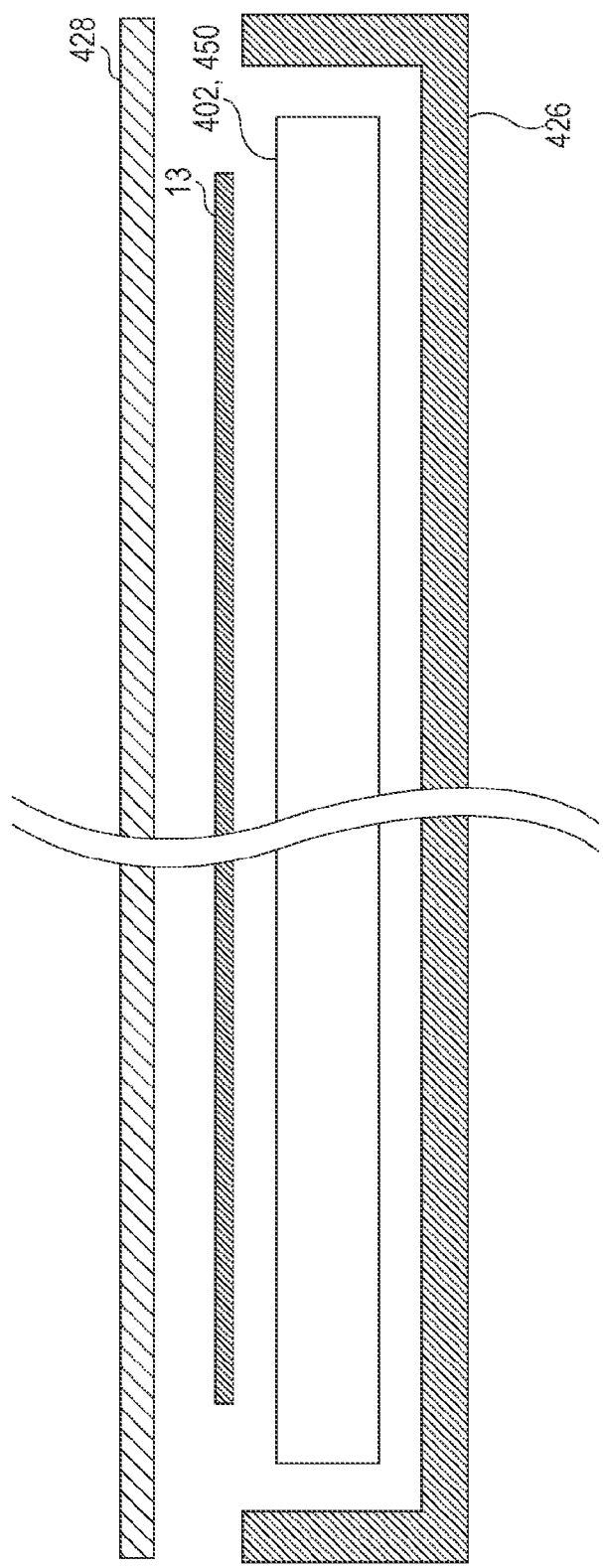
FIG. 9 is a cross-sectional view taken along the plane IX-IX of FIG. 8.

FIG. 8 is a side view schematically illustrating a fixing device 420 according to the second modification of the first exemplary embodiment, and FIG. 9 is a cross-sectional view taken along the plane IX-IX of FIG. 8. Differences from the fixing device 400 according to the first exemplary embodiment are that the fixing device 420 includes pressure rollers 422 and 424 that apply pressure to one of sheets 13 and that the fixing device 420 includes magnetic flux shielding bodies 426 and 428 instead of the magnetic flux shielding body 404.

In the above-described first modification, the magnetic flux generating device 402 generates a magnetic flux at a position at which pressing is performed. However, in the second modification, as illustrated in FIG. 8, the magnetic flux generating device 402 and the pressure rollers 422 and 424 are disposed in such a manner that the pressure rollers 422 and 424 apply pressure to one of the sheets 13 after a magnetic flux has been applied to the developer 406 on the sheet 13 by the magnetic flux generating device 402.

The pressure rollers 422 and 424 are respectively disposed above and beneath the sheet 13 that is to be transported and apply pressure to the sheet 13, which is to be transported, by nipping the sheet 13 in the top-bottom direction. Each of the pressure rollers 422 and 424 applies pressure to the sheet 13, which is to be transported, by rotating in the direction of a corresponding one of arrows in FIG. 8. The pressure rollers 422 and 424 are made of, for example, a material having a predetermined or higher heat insulation property. In addition, the pressure roller 422 includes a shielding layer made of a material such as aluminum that blocks a magnetic flux. In addition, the outer peripheral portion of the pressure roller 422 is covered with a release layer, and a surface of the sheet 13 on which developer images have been formed is less likely to be fixed onto the pressure roller 422.

The magnetic flux shielding bodies 426 and 428 are members that block the magnetic flux, which is generated by the magnetic flux generating device 402, and made of, for example, aluminum or the like. As illustrated in FIG. 8 and FIG. 9, the magnetic flux shielding body 426 is disposed beneath the sheet 13, which is to be transported, and has a square shape with a top surface (a surface facing the sheet 13) that is open. The magnetic flux generating device 402 is accommodated in the magnetic flux shielding body 426. The magnetic flux shielding body 428 is disposed above the sheet 13, which is to be transported, and is a plate-shaped shielding body that faces the magnetic flux generating device 402.

As described above, the second modification has a configuration in which the magnetic flux shielding bodies 426 and 428 and the shielding layer, which is included in the pressure roller 422, prevent the occurrence of leakage of a magnetic flux. Note that, as illustrated in FIG. 4 and FIG. 5, the occurrence of leakage of a magnetic flux may be prevented by a magnetic flux shielding body having a shape that surrounds a portion of the sheet 13 and the magnetic flux generating device 402 instead of by the magnetic flux shielding bodies 426 and 428 and the shielding layer, which is included in the pressure roller 422. Alternatively, a configuration in which the shielding layer of the pressure roller 422 is omitted, and in which the occurrence of leakage of a magnetic flux is prevented by the magnetic flux shielding bodies 426 and 428 may be employed.

In the fixing device 420 according to the second modification, the developer 406 on one of the sheets 13 generates heat and melts due to the influence of the magnetic flux that is generated by the magnetic flux generating device 402, and after that, the developer 406 is applied with pressure by the pressure rollers 422 and 424 that are arranged downstream of the magnetic flux generating device 402. This allows the surface of the developer 406 on the sheet 13 to become a mirror-finished surface, and gloss image quality may be obtained.

A third modification will now be described.

Figure 10:
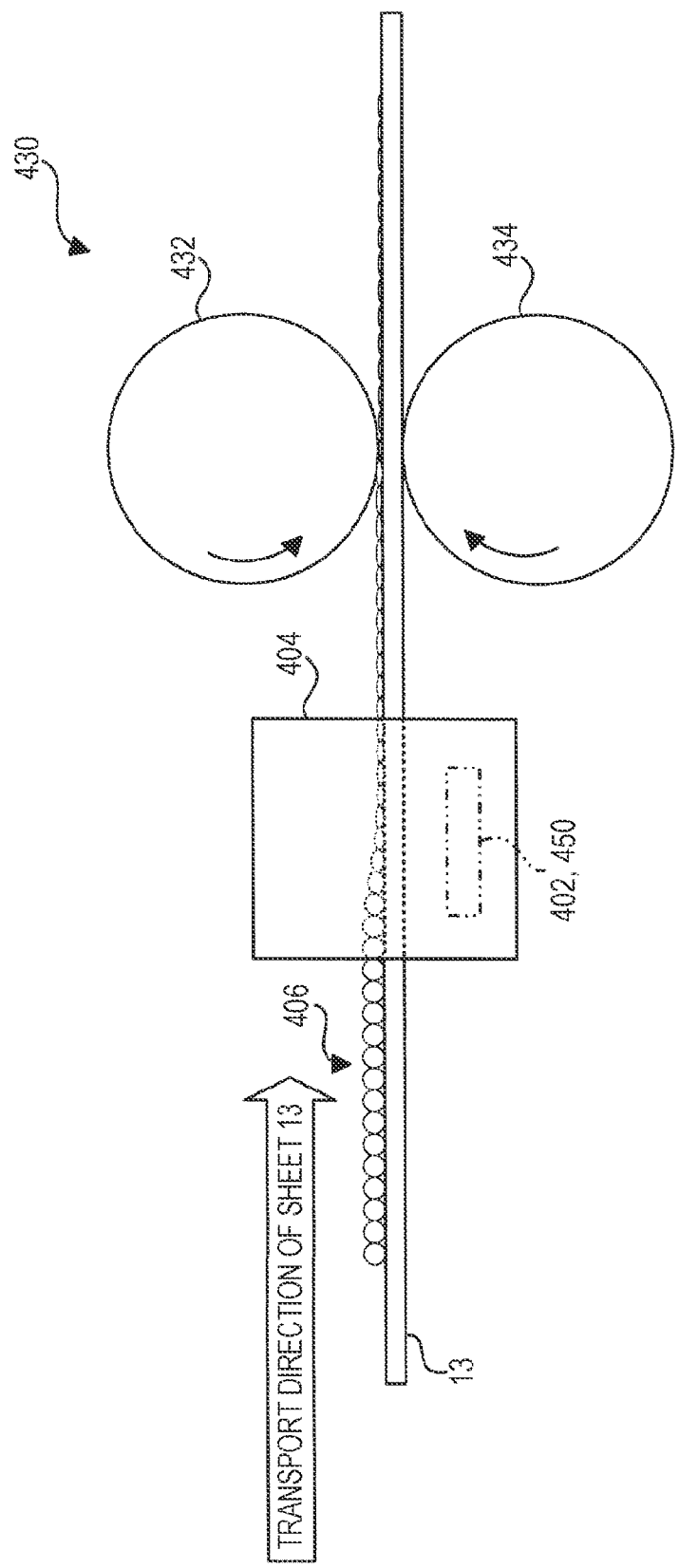
FIG. 10 is a side view schematically illustrating a fixing device according to a third modification of the first exemplary embodiment.

FIG. 10 is a side view schematically illustrating a fixing device 430 according to the third modification of the first exemplary embodiment. A difference from the fixing device 400 according to the first exemplary embodiment is that the fixing device 430 includes pressure rollers 432 and 434 that apply pressure to one of the sheets 13. In the second modification, the pressure rollers 422 and 424 are arranged immediately after the position at which the magnetic flux generating device 402 is disposed. On the other hand, in the third modification, the pressure rollers 432 and 434 are arranged at positions spaced apart from the magnetic flux generating device 402 by a predetermined distance in the transport direction. As described above, the distance from a position at which a magnetic flux is to be applied by the magnetic flux generating device 402 to the position at which pressing is performed may be suitably changed in accordance with, for example, a required finished quality.

Note that the pressure rollers 432 and 434 are respectively disposed above and beneath the sheet 13 that is to be transported and apply pressure to the sheet 13, which is to be transported, by nipping the sheet 13 in the top-bottom direction. Each of the pressure rollers 432 and 434 applies pressure to the sheet 13, which is to be transported, by rotating in the direction of a corresponding one of arrows in FIG. 10. The pressure rollers 432 and 434 are made of, for example, a material having a predetermined or higher heat insulation property. In addition, the outer peripheral portion of the pressure roller 432 is covered with a release layer, and a surface of the sheet 13 on which developer images have been formed is less likely to be fixed onto the pressure roller 432.

A second exemplary embodiment of the invention will now be described. In the first exemplary embodiment, the magnetic flux generating device 402, which functions as an energy generating unit, applies energy to the developer 406 on one of the sheets 13 and causes the developer 406 to be melted and fixed onto the sheet 13. A difference from the first exemplary embodiment is that, in the second exemplary embodiment, as illustrated in FIG. 4 to FIG. 10, a light emitting device 450 is used as an energy generating unit instead of the magnetic flux generating device 402. Note that the rest of the configuration is similar to that of the first exemplary embodiment, and thus, descriptions thereof will be omitted.

In a similar way to the magnetic flux generating device 402, the light emitting device 450 generates energy and applies the energy to the developer 406 on one of the sheets 13 on which an image has been formed by the image forming unit 100. More specifically, the light emitting device 450 radiates light of a predetermined wavelength (electromagnetic waves) onto the developer 406 on the sheet 13. Note that the light emitting device 450 is configured to, for example, radiate light across the full width of the sheet 13.

Similarly to as in the first exemplary embodiment, the developer that is used in the second exemplary embodiment includes carbon nanotubes. It is known that carbon nanotubes generate heat when subjected to light (electromagnetic waves). The fixing device 400 of the second exemplary embodiment utilizes this property of the carbon nanotubes and fixes the developer 406 onto one of the sheets 13 by causing the developer 406 to generate heat and melt by radiating light (electromagnetic waves) onto the carbon nanotubes, which is a heat generating material.

Here, the heating temperature of the developer 406 may be controlled by, for example, adjusting the irradiation period. For example, the light emitting device 450 may be configured to alternately repeat a state of emitting light of a predetermined wavelength and a state of not emitting such light in such a manner as to adjust the length of the duration of a light-emitting state. Alternatively, heat conduction that occurs in the carbon nanotubes may be suppressed by coating the carbon nanotubes with a material such as silicon.

Note that, similarly to as in the first exemplary embodiment, the above-described various modifications may also be made in the second exemplary embodiment.

A third exemplary embodiment of the invention will now be described.

Figure 11:
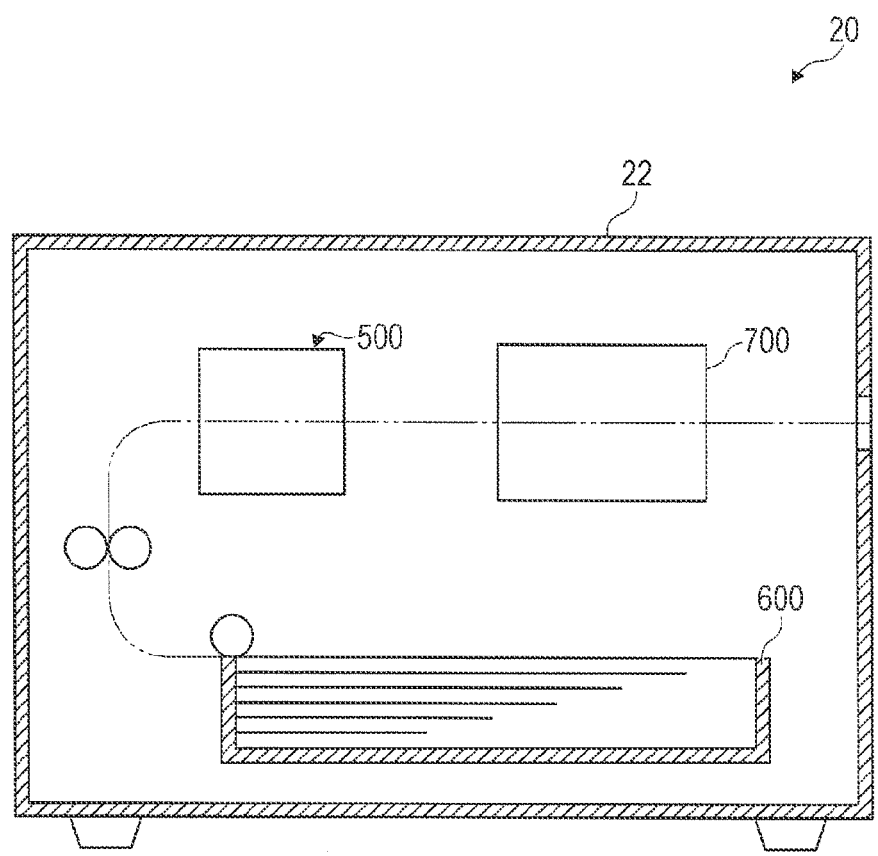
FIG. 11 is a schematic diagram illustrating a schematic configuration of an image forming apparatus according to a third exemplary embodiment of the invention as seen from the front.

FIG. 11 illustrates an image forming apparatus 20 according to the third exemplary embodiment of the invention. The image forming apparatus 20 includes an image forming apparatus body 22, and an image forming unit 500, a sheet feed device 600 that feeds a sheet, which is used as a recording medium, to the image forming unit 500, and a drying device 700 that is used as a drying unit are disposed in the image forming apparatus body 22.

The image forming unit 500 is formed of, for example, a unit that employs an electrophotographic system, which uses an aqueous developer, and forms an image on a sheet, a unit that employs an ink-jet method and forms an image on a sheet, or the like and forms an image on a sheet by using liquid droplets (ink). The liquid droplets include a heat generating material that generates heat as a result of being energized. In the third exemplary embodiment, the liquid droplets include carbon nanotubes as the heat generating material.

The drying device 700 dries the liquid droplets on a sheet on which an image has been formed by the image forming unit 500 by applying energy to the liquid droplets and causing the liquid droplets to generate heat. The drying device 700 has a configuration that is similar to, for example, that of the fixing device 400 described in the above first and second exemplary embodiments and the modifications of these exemplary embodiments and applies energy to the liquid droplets by generating a magnetic flux, light, or the like.

Although the exemplary embodiments of the invention have been described above, the present invention is not limited to the above-described exemplary embodiments, and various changes may be made within the gist of the present invention. For example, although the configuration in which carbon nanotubes are used as a heat generating material has been described, the heat generating material is not limited to the carbon nanotubes and may be any other material that generates heat by itself as a result of energy being applied thereto from the outside.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit configured to form an image on a recording medium by using a developer;
   a magnetic flux applying unit configured to apply a magnetic flux to the developer on the recording medium, the magnetic flux causing the developer to generate heat on the recording medium having the formed image; and
   a magnetic flux shielding body configured to limit an area of a magnetic field of the magnetic flux, which is applied by the magnetic flux applying unit,
   wherein the developer comprises carbon nanotubes as a heat generating material, the carbon nanotubes configured to facilitate fixation of the developer onto the recording medium by generating heat by using the magnetic flux.

2. The image forming apparatus according to claim 1, further comprising:
   a pressing unit configured to press the developer on the recording medium.

3. The image forming apparatus according to claim 1, wherein the developer is provided on a first side of the recording medium, and
   wherein the magnetic flux applying unit is provided on a second side opposite to the first side of the recording medium.

4. The image forming apparatus according to claim 1, wherein the carbon nanotubes are coated with silicon.

5. An image forming apparatus comprising:
   an image forming unit configured to form an image on a recording medium by using liquid droplets; and
   a magnetic flux applying unit configured to apply a magnetic flux to the developer on the recording medium, the magnetic flux causing the liquid droplets to generate heat on the recording medium having the formed image; and
   a magnetic flux shielding body configured to limit an area of a magnetic field of the magnetic flux, which is applied by the magnetic flux applying unit,
   wherein the liquid droplets comprise carbon nanotubes as a heat generating material, the carbon nanotubes configured to facilitate drying of the liquid droplets on the recording medium by generating heat by using the magnetic flux.

6. The image forming apparatus according to claim 5, wherein the liquid droplets are provided on a first side of the recording medium, and
   wherein the magnetic flux applying unit is provided on a second side opposite to the first side of the recording medium.

7. The image forming apparatus according to claim 5, wherein the liquid droplets are formed by an ink-jet method.

* * * * *